(12) United States Patent
Kazayama et al.

(10) Patent No.: US 7,092,575 B2
(45) Date of Patent: Aug. 15, 2006

(54) MOVING IMAGE ENCODING APPARATUS AND MOVING IMAGE ENCODING METHOD

(75) Inventors: Masahiro Kazayama, Tokyo (JP);
Tadashi Kasezawa, Tokyo (JP);
Kenichi Asano, Tokyo (JP); Masahiko Yoshimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 628 days.

(21) Appl. No.: 09/758,155

(22) Filed: Jan. 12, 2001

(65) Prior Publication Data
US 2002/0028023 A1 Mar. 7, 2002

(30) Foreign Application Priority Data
Sep. 6, 2000 (JP) .................... P. 2000-270264

(51) Int. Cl.
*G06K 9/36* (2006.01)
*G06K 9/46* (2006.01)
(52) U.S. Cl. ............... 382/236; 382/166; 382/238; 382/239; 375/240.02; 375/240.08
(58) Field of Classification Search .......... 348/578, 348/584, 595, 700; 375/240.01, 240.02, 375/240.08, 240.12, 240.16; 382/162, 166, 382/190–206, 232, 236, 238, 239, 243
See application file for complete search history.

(56) References Cited

U.S. PATENT DOCUMENTS

| | | | | |
|---|---|---|---|---|
| 5,283,645 A | * | 2/1994 | Alattar | 375/240.01 |
| 5,847,772 A | * | 12/1998 | Wells | 348/571 |
| 5,894,526 A | * | 4/1999 | Watanabe et al. | 382/236 |
| 6,084,641 A | * | 7/2000 | Wu | 348/722 |
| 6,097,737 A | * | 8/2000 | Takizawa et al. | 370/484 |
| 6,463,101 B1 | * | 10/2002 | Koto | 375/240.13 |

(Continued)

FOREIGN PATENT DOCUMENTS

JP 8242452 9/1996

(Continued)

OTHER PUBLICATIONS

Bhaskaran et al., "Image and Video Compression Standards—Algorithms and Architectures", 2nd ed., 1997, pp. 183-190.*

(Continued)

*Primary Examiner*—Jingge Wu
*Assistant Examiner*—Yubin Hung
(74) *Attorney, Agent, or Firm*—Birch, Stewart, Kolasch & Birch, LLP

(57) ABSTRACT

An encoding preprocessing part 1 extracts the amount of image feature relative to image data and passes the amount of image feature to a control part 2 as image feature amount information 11 and also sends image data 10 to an encoding part 3. The control part 2 determines whether there is a dissolve image or not based on the image feature amount information 11 and if it is determined that the image data 10 is the dissolve image, an encoding parameter 12 is set so that a configuration of GOP which is normally M=3 is changed into the configuration of GOP of M=2, and the encoding part 3 performs encoding based on the encoding parameter 12. As a result of that, a prediction error of a B-picture frame in a dissolve interval becomes substantially zero and on encoding in the dissolve interval, the amount of information occurrence in frames except I-picture and P-picture frames can be reduced and thus the amount of information occurrence as a whole can be reduced.

12 Claims, 4 Drawing Sheets

U.S. PATENT DOCUMENTS

| | | | |
|---|---|---|---|
| 6,631,210 B1 * | 10/2003 | Mutoh et al. | 382/176 |
| 6,771,825 B1 * | 8/2004 | Hurst, Jr. | 382/236 |
| 2002/0136297 A1 * | 9/2002 | Shimada et al. | 375/240.04 |

FOREIGN PATENT DOCUMENTS

| | | |
|---|---|---|
| JP | 08307878 A * | 11/1996 |
| JP | 9182079 | 7/1997 |
| JP | 09182079 A * | 7/1997 |
| JP | 9-322171 | 12/1997 |
| JP | 2000-59775 | 2/2000 |

OTHER PUBLICATIONS

Fernando et al., International Conference on Image Processing, vol. 3, Oct. 24-28, 1999, pp. 299-303.*

Gu et al., IEEE Int'l Conf. Intelligent Processing Systems, V. 2, Oct. 1997, pp. 1692-1696.*

English translation of JP 09182079A.*

Fernando et al. "Fade and Dissolve Detection in Uncompressed and COmpressed Video Sequences", Int'l Conf. on Image Processing, V. 3, Oct. 1999, pp. 24-28.*

* cited by examiner

MOVING IMAGE ENCODING APPARATUS AND MOVING IMAGE ENCODING METHOD

BACKGROUND OF THE INVENTION

1. Field of the Invention

The present invention relates to a moving image encoding apparatus and a moving image encoding method of performing inter-frame encoding of moving images by encoding techniques such as MPEG2.

2. Description of the Related Art

In conventional moving image encoding, MPEG2 etc. are used, and respective pictures are encoded by any of an I-picture for encoding only a frame, a P-picture for encoding the difference between a frame and a reference image using the past frame already encoded on a time basis as the reference image, and a B-picture for encoding the difference between a frame and a reference image using average values of the past frames already encoded on a time basis, the future frames or the past and future frames as the reference image. What these plural pictures are combined is defined as GOP and the number of frames constructing the GOP is indicated by N. Also, a distance between the I-picture and the neighboring P-picture of the GOP is denoted by M, and a configuration of the GOP is represented by the N and M and a distance between the nearest neighboring two P-pictures is also M.

FIG. 8 shows an example of the GOP configuration for N=15 and M=3.

In FIG. 8, images are arranged in the sequence of a frame 201, a frame 202, a frame 203, . . . , a frame 215 in order of time. Encoding first starts with the frame 203 which is the I-picture and next, the B-picture frames of the frame 201 and the frame 202 which are a frame older than the I-picture on a time basis are encoded. Then, the P-picture of the frame 206 after three pictures from the I-picture is encoded, and encoding is performed in the sequence of the frame 204 and the frame 205 which are two B-picture frames present between the I-picture and the P-picture. In like manner below, the P-picture after three pictures is encoded before encoding two B-pictures sandwiched between the I-pictures or the P-pictures, so that encoding is performed in the sequence of the frame 209, the frame 207, the frame 208, the frame 212, the frame 210, the frame 211, the frame 215, the frame 213 and the frame 214.

However, when predictive encoding of moving images is performed, an inter-frame prediction error may increase for some frames and thus, there was a problem that the amount of information occurrence in the case of prediction error encoding becomes large and degradation in image quality is caused.

Particularly, in the case of an image for making a special change in which special video processing is performed as a dissolve image, unlike motion of an object or pan of a camera, motion compensation prediction does not fall and the prediction is difficult, so that a prediction error signal might increase. As a result of that, when predictive encoding of the image for making a special change was performed, the amount of information occurrence became large and degradation in image quality was caused.

SUMMARY OF THE INVENTION

Therefore, the invention is implemented to solve the problem described above, and it is an object of the invention to provide a moving image encoding apparatus and a moving image encoding method capable of improving encoding efficiency of predictive encoding and minimizing degradation in image quality for an image in which the amount of information occurrence becomes large in the case of the predictive encoding by performing encoding based on features of a moving image to be encoded.

In order to solve the problem, a moving image encoding apparatus of the invention comprises an encoding preprocessing part for extracting the amount of image feature from a moving image before encoding and also sorting each frame constructing the moving image in order of encoding, a control part for setting an encoding parameter based on the amount of image feature extracted in the encoding preprocessing part, and an encoding part for encoding the moving image whose frames are sorted by the encoding preprocessing part based on the encoding parameter from the control part.

Also, it is characterized in that the encoding preprocessing part extracts the amount of image feature from a moving image before encoding, and the control part changes settings of encoding parameters within a dissolve interval and without the dissolve interval based on the amount of image feature extracted in the encoding preprocessing part.

Also, it is characterized in that the control part sets the encoding parameters so that a distance of an intra coded picture or a predictive coded picture is 2 when the encoding part encodes frames of the dissolve interval based on the amount of image feature extracted in the encoding preprocessing part.

Also, it is characterized in that the control part obtains a linear differential value and a quadratic differential value of the amount of image feature acquired from the encoding preprocessing part and determines whether there is the dissolve interval or not according to these values.

Also, it is characterized in that the encoding preprocessing part extracts the amounts of image feature every signal component of each frame constructing the moving image.

Also, it is characterized in that the encoding preprocessing part divides each frame constructing the moving image into plural regions and obtains the amount of image feature in each region unit.

Also, a moving image encoding method of the invention is characterized by extracting the amount of image feature from a moving image before encoding and also sorting each frame constructing the moving image in order of encoding and encoding the moving image whose frames are sorted based on an encoding parameter set on the basis of the amount of image feature.

Also, it is characterized in that the amount of image feature for detecting a dissolve interval from a moving image before encoding is extracted as the amount of image feature and settings of encoding parameters within the dissolve interval and without the dissolve interval are changed on the basis of the amount of image feature.

DETAILED DESCRIPTION OF THE PRESENT INVENTION

FIRST EMBODIMENT

A first embodiment of a moving image encoding apparatus according to the invention will be described. Incidentally, in the following first to fourth embodiments, as an image in which the amount of information occurrence becomes large in the case of predictive encoding, a dissolve image is used as one example and when it is determined that there is the dissolve image, by changing a configuration of GOP to perform encoding relative to the case of encoding except the dissolve image, a moving image encoding apparatus and a moving image encoding method for improving encoding efficiency will be described.

Figure 1:
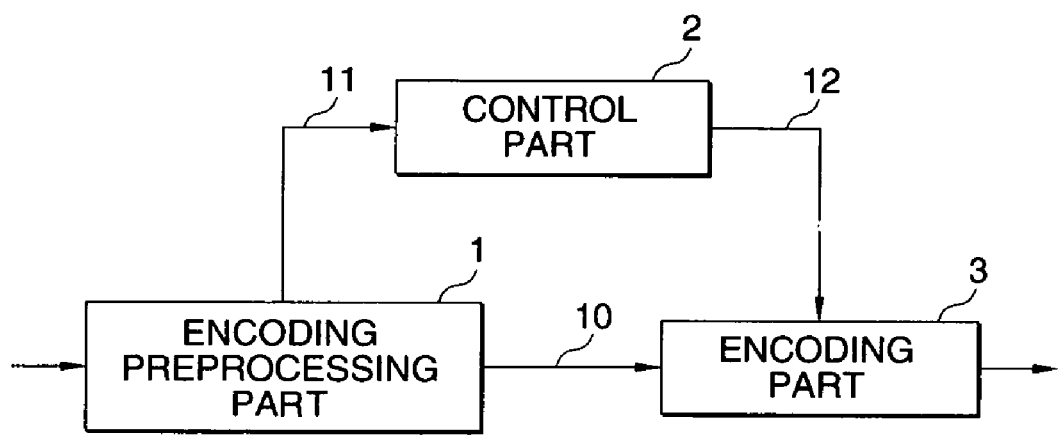
FIG. 1 is a diagram showing a configuration of a first embodiment of a moving image encoding apparatus according to the invention.

FIG. 1 is a diagram showing a configuration of the first embodiment of the moving image encoding apparatus according to the invention. In the drawing, numeral 1 is an encoding preprocessing part, and numeral 2 is a control part, and numeral 3 is an encoding part, and numeral 10 is image data, and numeral 11 is image feature amount information, and numeral 12 is an encoding parameter.

Next, operations will be described.

First, by the encoding preprocessing part 1, calculation for extracting the amount of image feature such as an interframe difference value is performed relative to image data to be encoded, and these information is passed to the control part 2 as the image feature amount information 11 and also is sent to the encoding part 3 as the image data 10.

The control part 2 determines whether there is a dissolve image or not based on these image feature amount information 11, and sets the encoding parameter 12 to the encoding part 3. For example, in the control part 2, if it is determined that the image data 10 encoded by the encoding part 3 is the dissolve image, the encoding parameter 12 is set to the encoding part 3 so that a distance M of an intra coded (I) picture or a predictive coded (P) picture out of the configuration of GOP is M=2 and on the other hand, if it is not determined that the image data 10 is the dissolve image, the encoding parameter is set so that the configuration of GOP is M=3. In the encoding part 3, by conditions set by the encoding parameter 12 from the control part 2, encoding is performed to the image data 10 inputted from the encoding preprocessing part 1.

Figure 2:
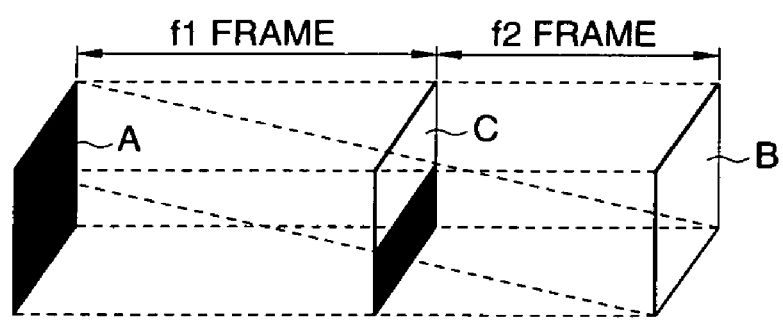
FIG. 2 is a diagram showing a concept of a dissolve image.

FIG. 2 shows a concept of dissolve processing. As shown in FIG. 2, the dissolve image is, for example, an image in which two images of a scene A and a scene B are mixed, and the case that the scene A is a fixed image (for example, all the screens are white) is particularly referred to as a fade-in image and the case that the scene B is a fixed image (for example, all the screens are white) is particularly referred to as a fade-out image.

A frame C in FIG. 2 is approximated as an image in the proportion of the scene A and the scene B, and for example, when the number of frames between the scene A and the frame C is f1 frame and the number of frames between the scene B and the frame C is f2 frame, a pixel value C(i,j) of the frame C can be approximated as shown in the following expression (1)

$$C(i,j)=\{f2 \times A(i,j)+f1 \times B(i,j)\}/(f1+f2) \quad \text{expression (1)}$$

Here, i indicates coordinates of the horizontal direction and j indicates coordinates of the vertical direction, and a pixel value of the frame A is represented by A(i,j) and a pixel value of the frame B is represented by B(i,j).

Next, a reason for changing the configuration of GOP depending on whether the image data is the dissolve image or not will be described.

Generally, in encoding of MPEG2, the encoding is often performed in the case that the distance M of the I-picture or the P-picture is M=3.

Figure 3:
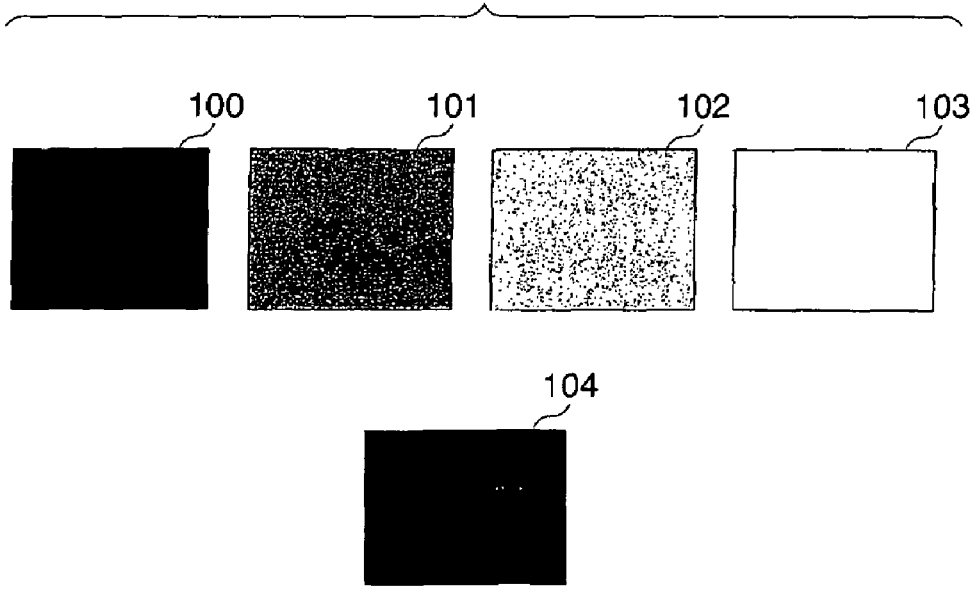
FIG. 3 is a diagram showing a dissolve image and a reference image for M=3 in a conventional art.

FIG. 3 shows a dissolve image and a reference image for M=3 in a conventional art.

FIG. 3 describes, for example, an example in which a luminance level gradually increases from black to become a white image. When a frame 100 is a black image frame of the I-picture or the P-picture and a frame 103 is a white image frame of the I-picture or the P-picture, using image data of these two frames 100 and 103, images of a frame 101 and a frame 102 which are a bidirectional predictive coded (B) picture present between the frames 100 and 103 must be predicted.

Here, when a pixel value of the frame 100 is D0 and a pixel value of the frame 101 is D1 and a pixel value of the frame 102 is D2 and a pixel value of the frame 103 is D3 and one inter-frame difference value is dif, relations of expressions (2) to (4) as shown below generally hold in the dissolve image.

$$D1-D0=\text{dif} \quad \text{expression (2)}$$

$$D2-D1=\text{dif} \quad \text{expression (3)}$$

$$D3-D2=\text{dif} \quad \text{expression (4)}$$

Also, a pixel value D4 of an image frame 104 obtained by averaging the frame 100 and the frame 103 can be indicated as the following expression (5).

$$D4=\{D0+D3\}/2 \quad \text{expression (5)}$$

As a result of this, each prediction error concerning the frame 101 can be indicated as expressions (6) to (8), respectively, when a forward prediction error in the case that the frame 100 is a forward prediction frame is indicated by dif_f and a backward prediction error in the case that the frame 103 is a backward prediction frame is indicated by dif_b and a bidirectional prediction error in the case that the frame 104 is a bidirectional prediction frame is indicated by dif_i.

$$\text{dif}\_f=D1-D0=\text{dif} \quad \text{expression (6)}$$

$$\text{dif}\_b=D3-D1=2 \times \text{dif} \quad \text{expression (7)}$$

$$\text{dif}\_i=D4-D1=\text{dif}/2 \quad \text{expression (8)}$$

Therefore, a relation as shown in the following expression (9) holds and in the case of a frame configuration with M=3 by the conventional art shown in FIG. 3, the dif_i with the smallest prediction error of these prediction errors, namely an image of the frame 104 is used as a predictive image concerning the frame 101 which is the B-picture.

$$\text{dif}\_i<\text{dif}\_f<\text{dif}\_b \quad \text{expression (9)}$$

However, for M=3 shown in FIG. 3, the prediction error dif_i is not so a small value even in the case of using the frame 104 with the smallest prediction error dif as the predictive image of the frame 101.

Also, in a manner similar to the case of the frame 101, prediction errors concerning the frame 102 are indicated as expressions (10) to (12), respectively, when a forward prediction error is indicated by dif_f and a backward prediction error is indicated by dif_b and a bidirectional prediction error is indicated by dif_i.

$$\text{dif}\_f = D2 - D0 = 2 \times \text{dif} \qquad \text{expression (10)}$$

$$\text{dif}\_b = D3 - D2 = \text{dif} \qquad \text{expression (11)}$$

$$\text{dif}\_i = D4 - D2 = \text{dif}/2 \qquad \text{expression (12)}$$

Therefore, a relation as shown in the following expression (13) holds and in the case of a frame configuration with M=3 by the conventional art shown in FIG. 3, the dif_i with the smallest prediction error of these prediction errors, namely an image of the frame 104 is used as a predictive image concerning the frame 102 which is the B-picture.

$$\text{dif}\_i < \text{dif}\_b < \text{dif}\_f \qquad \text{expression (13)}$$

However, for M=3 shown in FIG. 3, the prediction error dif_i is not so a small value in a manner similar to the case of the frame 101 even in the case of using the frame 104 with the smallest prediction error dif as the predictive image of the frame 102.

Figure 4:
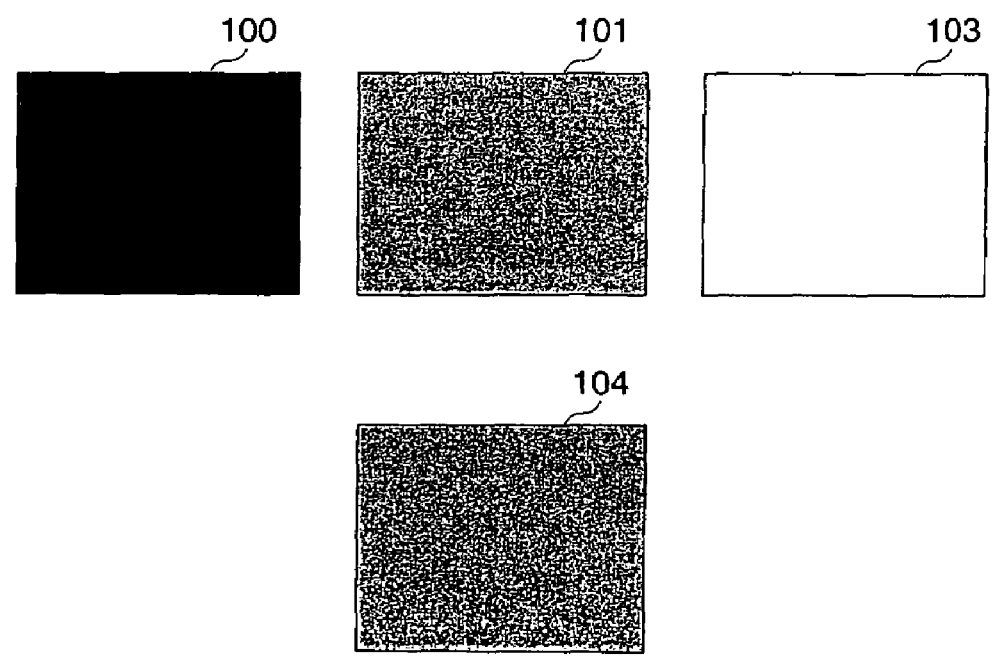
FIG. 4 is a diagram showing a dissolve image and a reference image for M=2 in the first embodiment.

FIG. 4 shows a dissolve image and a reference image for M=2 in the first embodiment. In FIG. 4, a frame 100 and a frame 103 are images of the already encoded I-picture or P-picture and for the first embodiment, a frame 101 is an image of the B-picture to be encoded using the frame 100 and the frame 103.

Here, in a manner similar to the case of FIG. 3, when a pixel value of the frame 100 is D0 and a pixel value of the frame 101 is D1 and a pixel value of the frame 103 is D3 and one inter-frame difference value is dif, relations of expressions (14) and (15) as shown below generally hold in images of the frames 100 to 103 of a dissolve interval.

$$D1 - D0 = \text{dif} \qquad \text{expression (14)}$$

$$D3 - D1 = \text{dif} \qquad \text{expression (15)}$$

Also, a pixel value D4 of a frame 104 obtained by averaging the frame 100 and the frame 103 can be indicated as the following expression (16) in a manner similar to the expression (5).

$$D4 = \{D0 + D3\}/2 \qquad \text{expression (16)}$$

As a result of this, each prediction error concerning the frame 101 is indicated as expressions (17) to (19) respectively, when a forward prediction error is indicated by dif_f and a backward prediction error is indicated by dif_b and a bidirectional prediction error is indicated by dif_i.

$$\text{dif}\_f = D1 - D0 = \text{dif} \qquad \text{expression (17)}$$

$$\text{dif}\_b = D3 - D1 = \text{dif} \qquad \text{expression (18)}$$

$$\text{dif}\_i = D4 - D1 \approx 0 \qquad \text{expression (19)}$$

Therefore, a relation as shown in the following expression (20) holds and in the case of a frame configuration with M=2 by the first embodiment shown in FIG. 4, when an image of the frame 104 of the dif_i with the smallest prediction error of these prediction errors is used as a predictive image concerning the frame 101 which is the B-picture, this prediction error becomes the value approximate to about zero. Incidentally, this prediction error may become zero depending on conditions.

$$\text{dif}\_i (\approx 0) \ll \text{dif}\_b = \text{dif}\_f = \text{dif} \qquad \text{expression (20)}$$

As a result of that, for the first embodiment, the prediction error of the B-picture frame 101 in the dissolve interval becomes about zero and on encoding in the dissolve interval, only in the case of the frames 100 and 103 of the I-picture or the P-picture, encoding data occurs and the amount of information occurrence can be suppressed.

Therefore, according to the first embodiment, when the dissolve interval is detected, by changing the M value within the dissolve interval relative to the M value without the dissolve interval to change a configuration of GOP, the inter-frame difference value in the B-picture frame can be made to zero and be made smaller than that of the conventional method and as a result of that, the image with slight degradation can be encoded.

SECOND EMBODIMENT

Next, a second embodiment characterized by being constructed so that an encoding preprocessing part 1 further obtains the amounts of image feature every signal component in relation to the first embodiment and outputs information about the amounts of image feature every signal component to a control part 2 will be described.

Figure 5:
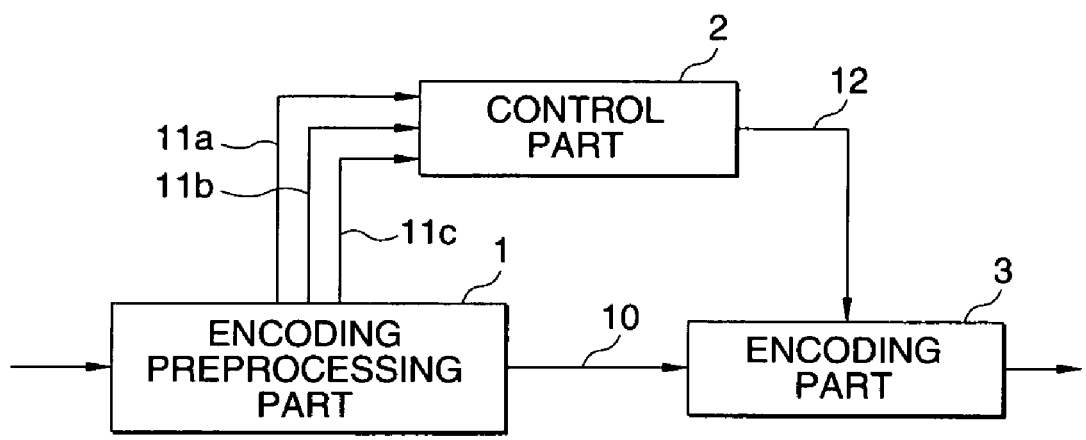
FIG. 5 is a diagram showing a configuration of a second embodiment of a moving image encoding apparatus according to the invention.

FIG. 5 is a diagram showing a configuration of the second embodiment of a moving image encoding apparatus according to the invention.

The second embodiment differs from the first embodiment in that the encoding preprocessing part 1 obtains the amounts of image feature every signal component and outputs the amounts of image feature obtained every signal component in parallel relation to the control part 2 and the control part 2 inputs to process the amounts of image feature every signal component inputted in parallel. In FIG. 5, numeral 11*a* is image feature amount information of a Y signal and numeral 11*b* is image feature amount information of a Cb signal and numeral 11*c* is image feature amount information of a Cr signal.

Next, peculiar operations of the second embodiment will be described. Unlike the first embodiment, in the second embodiment, the encoding preprocessing part 1 obtains the amounts of image feature every signal component and outputs the amounts of image feature obtained every signal component in parallel relation to the control part 2 and the control part 2 inputs to process the amounts of image feature every signal component inputted in parallel, so that, for example, in two scenes, detection can be made as a dissolve interval even in the scenes in which the Y signal that is a luminance component little changes at the substantially same level and the Cb signal or the Cr signal that is a color difference component gradually changes.

Therefore, according to the second embodiment, it is constructed so as to obtain the amounts of image feature every signal component, so that error detection of the dissolve interval can be prevented and encoding processing can be performed more effectively and also, detection can be made as the dissolve interval even in the case of the scenes in which only a particular signal component changes by dissolve processing. Thus, when the dissolve interval is detected, by changing the M value within the dissolve interval relative to the M value without the dissolve interval to change a configuration of GOP, the inter-frame difference value in the B-picture frame can be made smaller than that of the conventional method and as a result of that, the image with slight degradation can be encoded.

Incidentally, in the second embodiment, the description constructed so as to output the amounts of image feature every signal component in parallel relation to the control part 2 from the encoding preprocessing part 1 has been made, but in the invention, the amounts of image feature every signal component are not necessarily sent at the same time and may naturally be sent in a time division manner.

THIRD EMBODIMENT

A third embodiment showing in detail dissolve interval detection processing within a control part 2 in relation to the first and second embodiments will be described. Incidentally, since the configuration itself of the moving image encoding apparatus is identical to that of FIG. 1 or FIG. 5, operations of the control part 2 will be described with reference to the accompanying drawings.

Figure 6:
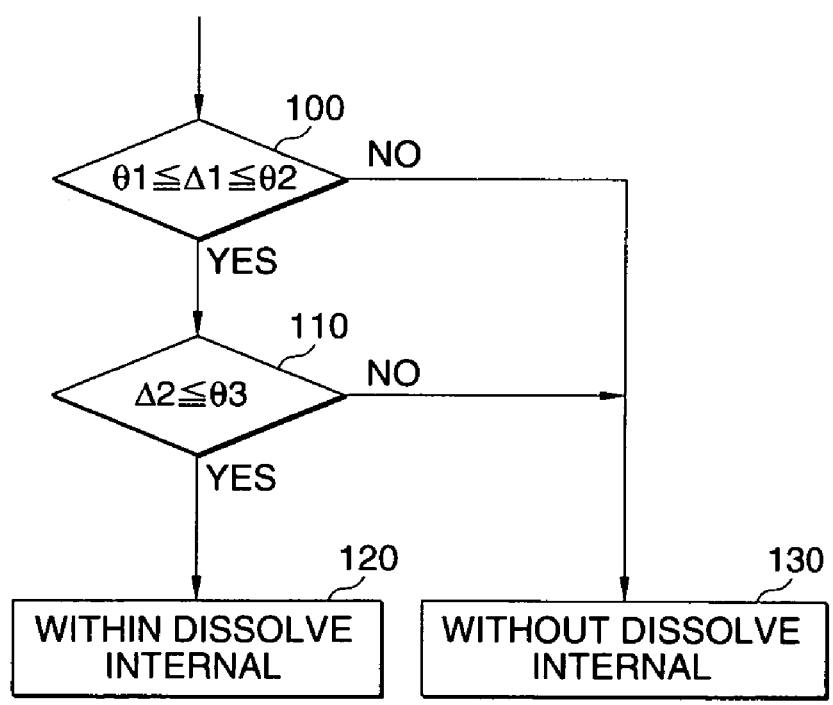
FIG. 6 is a flow diagram of operations of dissolve interval detection processing within a control part 2 of a third embodiment.

FIG. 6 is a flow diagram of operations of the dissolve interval detection processing within the control part 2 of the third embodiment.

First, an encoding preprocessing part 1 extracts the amount of image feature such as an inter-frame difference value from each frame of an inputted moving image and outputs the amount of image feature to the control part 2 as image feature amount information 11, and the control part 2 performs the dissolve interval detection processing based on this image feature amount information 11.

Specifically, assuming that a linear differential value of the image feature amount information 11 is $\Delta 1$ and a difference of the linear differential value of the image feature amount information 11 is a quadratic differential value $\Delta 2$ of the image feature amount information 11 and also $\theta 1$, $\theta 2$, $\theta 3$ are predetermined constants with a relation of $\theta 1 < \theta 2$, it is first determined whether a condition of the following expression (20) is satisfied or not, namely the linear differential value $\Delta 1$ which is the rate of change of the image feature amount information 11 is in the range of the predetermined value $\theta 1$ to $\theta 2$ and the amount of image feature gradually changes or not (step S100) and if the condition of this expression (20) is satisfied ("Yes" in step S100), it is further determined whether a condition of the following expression (21) is satisfied or not, namely the quadratic differential value $\Delta 2$ which is the rate of change of the linear differential value $\Delta 1$ is less than or equal to the predetermined value $\theta 3$ or not (step S110) and if the condition of this expression (21) is also satisfied ("Yes" in step S110), it is determined that there is within a dissolve interval (step S120).

$$\theta 1 \leq \Delta 1 \leq \theta 2 \quad \text{expression (20)}$$

$$\theta 2 \leq \theta 3 \quad \text{expression (21)}$$

Incidentally, if the linear differential value $\Delta 1$ of the image feature amount information 11 is not in the range of the predetermined value $\theta 1$ to $\theta 2$ and the expression (20) is not satisfied ("No" in step S100), it is determined that there is without the dissolve interval (step S130), and also if the expression (20) is satisfied and the quadratic differential value $\Delta 2$ of the image feature amount information 11 is more than the predetermined value $\theta 3$ ("Yes" in step S100 and "No" in step S11), it is determined that there is without the dissolve interval (step S130).

Incidentally, in the case of the second embodiment shown in FIG. 5, the image feature amount information 11a to 11c inputted from the encoding preprocessing part 1 to the control part 2 are separated every signal component, so that the control part 2 makes the determination of the dissolve interval based on the respective image feature amount information 11a to 11c every signal component in the above manner.

Therefore, according to the third embodiment, it is constructed so as to detect the dissolve interval using the linear differential value $\Delta 1$ and the quadratic differential value $\Delta 2$ of the image feature amount information 11, so that it is not determined that there is the dissolve interval even in the case of images in which scene changes are made and the dissolve interval can be detected. As a result of that, when the dissolve interval is detected, in a manner similar to the cases of the first and second embodiments, by changing the M value within the dissolve interval relative to the M value without the dissolve interval to change a configuration of GOP, the inter-frame difference value in the B-picture frame can be made to zero and be made smaller than that of the conventional method and thus, the image with slight degradation can be encoded.

FOURTH EMBODIMENT

In the first to third embodiments, the description constructed so that the encoding preprocessing part 1 extracts the amount of image feature in a frame unit has been made, but next, a fourth embodiment in which an extraction unit of the amount of image feature is not a frame and is a local region unit obtained by dividing a frame (screen) into plural local regions and the amount of image feature is extracted in a local region unit and the control part 2 determines whether there is within the dissolve interval in the region unit or not will be described. Incidentally, since the configuration itself of the moving image encoding apparatus is identical to that of FIG. 1 or FIG. 5, operations in which the encoding preprocessing part 1 divides a frame (screen) into plural local regions and determines whether there is within the dissolve interval or not will be described with reference to the accompanying drawings.

Figure 7:
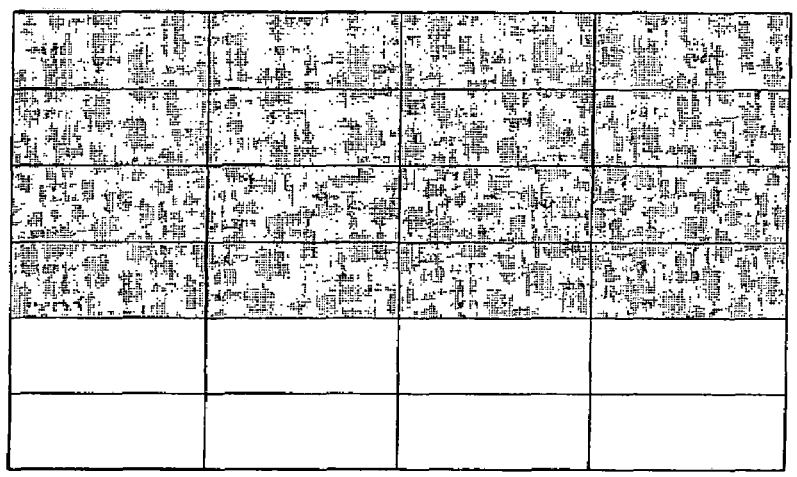
FIG. 7 is a diagram showing an example of screen division in a fourth embodiment.
Figure 8:
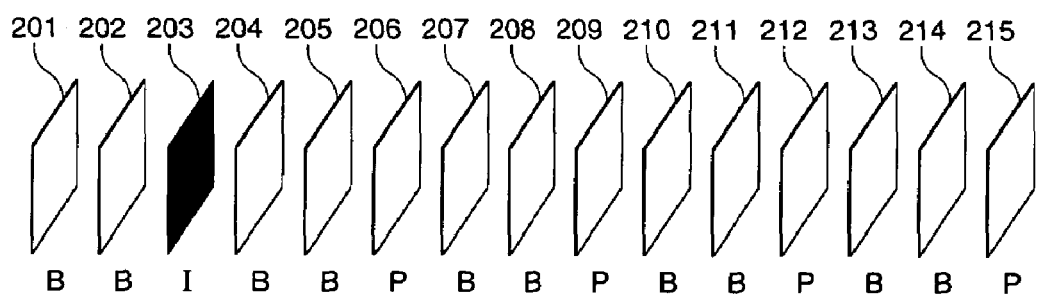
FIG. 8 is a diagram showing a GOP configuration example for N=15 and M=3.

FIG. 7 is a diagram showing an example of screen division in the fourth embodiment.

FIG. 7 is an example in which one frame (screen) is divided into four pieces in a horizontal direction and six pieces in a vertical direction and is divided into 24 local regions as a whole, and the encoding preprocessing part 1 extracts the amount of image feature every the divided local region in a region unit and outputs the amount of image feature to the control part 2 as the image feature amount information 11 as shown in FIG. 1 or the image feature amount information 11a to 11c as shown in FIG. 5.

The control part 2 inputs the image feature amount information 11 or the image feature amount information 11a to 11c every the divided local region, and determines whether there is within the dissolve interval or not every the divided local region in a manner similar to the cases of the first to third embodiments.

In that case, for example, if the control part 2 primarily determines that a total of 16 local regions of upper four rows shown by hatch in FIG. 7 are within the dissolve interval and a total of 8 local regions of lower two rows are without the dissolve interval, the control part 2 determines that one-half or more local regions are within the dissolve interval, so that it is finally determined that this frame is within the dissolve interval and in a manner similar to the cases of the first to third embodiments, the encoding parameter 12 is set so that a configuration of GOP is M=2 and encoding processing is performed by the encoding part 3.

On the other hand, if the number of local regions primarily determined that the local regions are within the dissolve interval is less than one-half of all the local regions of the one frame, the control part 2 finally determines that this frame is without the dissolve interval and in a manner similar to the cases of the first to third embodiments, the encoding parameter 12 is set so that the configuration of GOP is M=3 and encoding processing is performed by the encoding part 3.

Therefore, according to the fourth embodiment, it is constructed so as to extract the amount of image feature in a local region unit obtained by dividing one frame into plural regions and determine whether dissolve processing is performed every local region or not and determine whether said frame is within the dissolve interval or not based on the proportion of the dissolved local regions, so that it can be determined whether the frame is within the dissolve interval or not even in the case of a moving image in which the dissolve processing is performed only in the particular local regions of one frame. Thus, in a manner similar to the cases of the first to third embodiments, by changing the M value within the dissolve interval relative to the M value without the dissolve interval to change a configuration of GOP in relation to the frame of the dissolve interval, the inter-frame difference value in the B-picture frame can be made to zero or be made smaller than that of the conventional method and as a result of that, the image with slight degradation can be encoded.

Incidentally, in the fourth embodiment, the description constructed so as to determine whether the whole one frame is within the dissolve interval or not by whether the proportion of the dissolved local regions is more than one-half of all the local regions of the one frame or not has been made, but the invention is not limited to this and may naturally be constructed so as to determine that the whole one frame is within the dissolve interval even in the case that the proportion of the dissolved local regions is less than or equal to one-half of all the local regions, or may naturally be constructed so as to determine whether the dissolve processing is performed or not in one or plural particular local regions and thereby determine whether the whole one frame is within the dissolve interval or not. Thus, even in the case of frames in which a dissolved region is small or the dissolve processing is locally performed, it can be regarded as the frame in which the dissolve processing is performed as the whole frame. Therefore, even in the case of images such as so-called picture-in-picture or picture-out-picture, detection can easily be made as the dissolve interval.

Also, the description constructed so as to determine whether the whole one frame is within the dissolve interval or not based on the proportion of the dissolved local regions has been made, but the invention is not limited to this and may naturally be constructed so as to determine whether there is within the dissolve interval or not every local region and change the configuration of GOP every local region in the above manner. Thus, on encoding images with high image quality such as HDTV, when a screen is divided to perform encoding by individual encoding apparatus, the configurations of GOP can be changed to perform the encoding in the respective encoding apparatus.

Also, in the first to fourth embodiments, the description constructed so as to extract the amount of image feature from the moving image before encoding and determine whether there is within the dissolve interval or not based on the amount of image feature extracted and perform encoding by changing the M value of GOP to change the configuration of GOP in the case that there is within the dissolve interval and improve efficiency of the encoding has been made, but the invention is not limited to this and may naturally be constructed so as to determine whether there is an image in which the amount of information on a prediction error signal possibly becomes large or not like the case of an image for making a special change in which special video processing other than a dissolve image is performed or a scene change image based on the amount of image feature extracted and perform predictive encoding by changing the encoding parameter, for example, changing the M value or N value of GOP to change the configuration of GOP or changing a quantization step in the case of the image in which the amount of information on the prediction error signal possibly becomes large and thereby improve efficiency of the encoding.

As described above, according to the invention, it is constructed so as to extract the amount of image feature from a moving image before encoding and also sort each frame constructing the moving image in order of encoding and encode the moving image whose frames are sorted based on an encoding parameter set on the basis of the amount of image feature, so that in the case of an image in which the amount of information on a prediction error signal possibly becomes large, encoding can be performed on the basis of the feature and as a result of that, the amount of information occurrence on the encoding can be reduced.

Particularly, it is constructed so as to extract the amount of image feature from a moving image before encoding and determine whether there is a dissolve interval or not and encode the moving image by changing settings of encoding parameters within the dissolve interval and without the dissolve interval in the case that there is the dissolve interval, so that encoding suitable for a dissolve image can be performed in the dissolve interval and efficiency of the encoding improves and there is the effect of obtaining an image with less degradation.

Also, in the case that there is the dissolve interval, a distance of an intra coded picture or a predictive coded picture is set to 2, so that a prediction error signal of a bidirectional predictive coded picture in the range of the distance can be made to substantially zero and the amount of information occurrence of the dissolve interval can be reduced.

Also, it is constructed so as to obtain a linear differential value and a quadratic differential value of the amount of image feature and determine whether there is the dissolve interval or not according to these values, so that it is not determined that there is the dissolve interval even in the case of images in which scene changes are made and the dissolve interval can be detected.

Also, it is constructed so as to extract the amounts of image feature every signal component of each frame and make a determination every signal component, so that a special change in an image of the dissolve interval can be detected and error detection of the special change in the image can be prevented and encoding processing can be performed more effectively and also, the change can be detected even in the case of a scene in which only a particular signal component changes.

Also, it is constructed so as to divide a frame into plural regions and obtain the amount of image feature in each region unit, so that a special change in an image of the dissolve interval can be detected even in each region unit acquired by dividing the frame into the plural regions other than the whole frame. As a result of that, the special change in the image of the dissolve interval can be detected even in images such as picture-in-picture or picture-out-picture.

Further, when a screen is divided to perform encoding by individual encoding apparatus on encoding images with high image quality such as HDTV, configurations of GOP can be changed to perform the encoding in the respective encoding apparatus.

What is claimed is:

1. A moving image encoding apparatus comprising:
an encoding preprocessing portion for extracting an amount of image feature from a moving image not encoded and sorting each of frames constructing the moving image in order of the encoding, wherein the amount of image feature is extracted on an interframe basis;
a control portion upon receiving the image feature extracted from the preprocessing portion, setting interframe encoding parameters based on the amount of image feature extracted in the encoding preprocessing portion; and
an encoding portion for encoding the moving image whose frames are sorted by the encoding preprocessing portion, based on the encoding parameters from the control portion,
wherein the interframe encoding parameters are set to decrease a distance between an I-picture picture and a neighboring P-picture of a Group of Pictures (GOP).

2. The moving image encoding apparatus as claimed in claim 1, wherein the encoding preprocessing portion extracts the amount of image feature for detecting a dissolve interval from the moving image not encoded, and the control portion changes settings of the encoding parameters within the dissolve interval and without the dissolve interval based on the amount of image feature extracted in the encoding preprocessing portion.

3. The moving image encoding apparatus as claimed in claim 2, wherein the control portion sets the encoding parameters so that a distance between an intra coded picture and a neighboring predictive coded picture is 2, and a distance between nearest neighboring two predictive coded pictures is also 2 when the encoding portion encodes the frames of the dissolve interval based on the amount of image feature extracted in the encoding preprocessing portion.

4. The moving image encoding apparatus as claimed in claim 1, wherein the control portion obtains a linear differential value and a quadratic differential value of the amount of image feature acquired from the encoding preprocessing portion and determines whether there is the dissolve interval or not according to the linear differential value and the quadratic differential value.

5. The moving image encoding apparatus as claimed in claim 1, wherein the encoding preprocessing portion extracts the amount of image feature for each signal component of each of the frames constructing the moving image.

6. The moving image encoding apparatus as claimed in claim 1, wherein the encoding preprocessing portion divides each of the frames constructing the moving image into a plurality of regions and obtains the amount of image feature for each of the plurality of regions.

7. A moving image encoding method comprising the steps of:
extracting an amount of image feature from a moving image prior to encoding, wherein the amount of image feature is extracted on an interframe basis;
sorting each of frames constructing the moving image in order of encoding;
obtaining the extracted image feature, by a controller, the controller setting interframe encoding parameters based on the extracted image feature; and
encoding the moving image whose frames are sorted based on an interframe encoding parameter set according to the amount of image feature, wherein the interframe encoding parameter is set to decrease a distance between an I-picture and a neighboring P-picture of a GOP.

8. The moving image encoding method as defined in claim 7, further comprising:
extracting the amount of image feature for detecting a dissolve interval from a moving image not encoded, as the amount of image feature; and
changing settings of the encoding parameters within the dissolve interval and without the dissolve interval on the basis of the amount of image feature.

9. A moving image encoding apparatus, comprising:
an encoding preprocessing module which extracts interframe feature information from an unencoded moving image and sorts frames of the moving image in order of encoding;
a control module operatively connected to the encoding preprocessing module, wherein the control module sets interframe encoding parameters based upon the extracted interframe feature information received from the encoding preprocessing module; and
an encoding module operatively connected to the encoding preprocessing module and the control module, wherein the encoding module encodes the moving image based upon the encoding parameters, wherein the interframe encoding parameters are set to decrease a distance between an I-picture and a nearest neighboring P-picture of a GOP.

10. A moving image encoding apparatus comprising:
an encoding preprocessing portion for extracting an amount of image feature from a moving image not encoded and sorting each of frames constructing the moving image in order of the encoding, wherein the amount of image feature is extracted on an interframe basis;
a control portion upon receiving the image feature extracted from the preprocessing portion, setting interframe encoding parameters based on the amount of image feature extracted in the encoding preprocessing portion; and
an encoding portion for encoding the moving image whose frames are sorted by the encoding preprocessing portion, based on the encoding parameters from the control portion,
wherein the interframe encoding parameters are set to decrease a distance between a nearest neighboring two P pictures.

11. A moving image encoding method comprising the steps of:
extracting an amount of image feature from a moving image prior to encoding, wherein the amount of image feature is extracted on an interframe basis;
sorting each of frames constructing the moving image in order of encoding;
obtaining the extracted image feature, by a controller, the controller setting interframe encoding parameters based on the extracted image feature; and
encoding the moving image whose frames are sorted based on an interframe encoding parameter set according to the amount of image feature, wherein the interframe encoding parameter is set to decrease a distance between a nearest neighboring two P pictures.

12. A moving image encoding apparatus, comprising:

an encoding preprocessing module which extracts interframe feature information from an unencoded moving image and sorts frames of the moving image in order of encoding;

a control module operatively connected to the encoding preprocessing module, wherein the control module sets interframe encoding parameters based upon the extracted interframe feature information received from the encoding preprocessing module; and an encoding module operatively connected to the encoding preprocessing module and the control module, wherein the encoding module encodes the moving image based upon the encoding parameters, wherein the interframe encoding parameters are set to decrease a distance between a nearest neighboring two P pictures.

* * * * *